June 21, 1955 R. F. ZUMWALT 2,711,313
PRE-LOADED FLUID SPRING
Filed May 25, 1951

INVENTOR.
Robert F. Zumwalt
BY
Edwin B. Gary
Attorney.

United States Patent Office 2,711,313
Patented June 21, 1955

2,711,313

PRE-LOADED FLUID SPRING

Robert F. Zumwalt, Kenmore, N. Y., assignor to Wales-Strippit Corporation, North Tonawanda, N. Y., a corporation of New York Application May 25, 1951, Serial No. 228,215

2 Claims. (Cl. 267—1)

This invention relates to a device characterized by a body of fluid which is compressible, in response to forces of compression, either to provide a desired resilient or cushioning action or to store energy which may be released to perform work when the forces of compression are relieved.

A device of the general type described is disclosed in the copending application of Paul H. Taylor, Serial No. 180,966, filed August 23, 1950. Such a device, also referred to as a "fluid spring," has the advantage that it is compact in design and is capable of carrying loads and/or storing energy far beyond the capacity of conventional mechanical springs of comparable size.

The device of the invention is characterized by features which enable it to be readily associated with various kinds of instrumentalities. Highly beneficial results may be obtained when the device is associated with instrumentalities in which the space available is limited or in connection with instrumentalities wherein the resilient forces to be developed and released are substantial. The device of the invention may, for example, be employed in connection with blanking apparatus of the kind disclosed in the George F. Wales Patent No. 1,811,987 of June 30, 1931, and George F. Wales Patent No. 2,324,657 of July 20, 1943. The device, when so employed, replaces the mechanical spring units illustrated in said patents for providing the forces required for stripping purposes, which forces are developed by the ram of the press incident to the operation of the blanking elements and are released as the ram of the press returns to a retracted position upon completion of its working stroke.

The use of mechanical springs, as illustrated in said patents, has a number of objections, a serious one being that such springs require considerable space and hence increase substantially the overall dimensions of the apparatus. Further, it is frequently necessary to highly load the springs in order to develop the required stripping forces. High loads subject the springs to excessive fatigue and may necessitate their replacement after as few as 10,000 to 15,000 operations. Moreover such springs are ordinarily held under some predetermined preload. As a coil spring may be unstable in a compressed state, it may be necessary to provide guiding means so that the coils of the spring will be kept aligned with respect to the axis of the spring. For example, a steel spring capable of being loaded to the 3,000 pounds of the illustrated fluid spring having a 5/16 inch stroke would be approximately 7 inches long with a coil diameter of 2 inches and a wire diameter of 9/10 inch. Such a spring would be unstable under compression and would have to be guided.

A further objection to the use of mechanical springs is that their failure, apart from the necessity of replacing them, may result in damage to the apparatus with which they are associated and possible injury to workmen in the vicinity.

In many instances mechanical springs, despite the various objections to their use, may not be availed of in connection with perforating operations because the space within such apparatus may be too limited to enable loading of the springs to the degree necessary to operate the stripping means in the manner required. To overcome this objection, it has been the practice heretofore to perforate the work in two or more operations or to employ an air cushion type of press which either provides the necessary stripping forces, or augments the forces provided by the springs associated with the perforating apparatus. Presses of the air cushion type are considerably more costly than conventional presses which are entirely satisfactory when the required stripping forces are provided by the springs which are associated with the perforating apparatus. Hence the use of special presses of the air cushion type increases substantially the cost of the perforating operations.

The invention contemplates the avoidance of the various objections noted above which attend the use of mechanical springs by the employment of a fluid medium, preferably an oil or other suitable liquid, which may be compressed and reduced in volume during the working stroke of a work-performing instrumentality, whereby to store energy in said medium which may be released to perform work by permitting the fluid medium to expand upon completion of the working stroke of the instrumentality. The invention contemplates the use of such a fluid medium solely for shock absorbing purposes, also as a means for applying yielding pressures to various elements and machine parts.

Among the fluids which may be utilized for this purpose are mineral oils. Silicone fluids and alcohol such as amyl alcohol or pentanol which have compressibilities of the order of 20% at pressures of 50,000 p. s. i. may also be employed to advantage. For most practical purposes, a mechanical spring of the coil type cannot provide a pressure much in excess of 1,000 p. s. i. considering its projected area in the coil spring configuration. A comparison of the efficiency of the compression of oil, for example, to a mechanical spring indicates a gain of some 50 to 1 for the fluid springs against the mechanical steel springs. Although for various reasons it may not be feasible, practicable, or necessary to utilize a gain ratio as high as 50 to 1, an overall gain of 8 or 10 to 1 will be generally found adequate for any given volumes encompassed by mechanical or fluid springs. It may be noted here that mechanical springs as such are subject to the limitation that they provide a load along the longitudinal axis of their coils and that space must be provided in this direction for any particular given steel spring. The chamber in which a compressible fluid is confined, on the other hand, may be placed on any axis desired without the necessity of conforming with the axis of travel of the spring itself. This insures flexibility in the manner in which the fluid spring may be utilized. See in this connection the copending application of Paul H. Taylor, Serial No. 185,606, filed September 19, 1950.

The principal object of the present invention, therefore, is to provide a device for the general purpose contemplated wherein the resilient forces which are to be availed of are developed in a compressible fluid medium, provision being made for placing said fluid medium under an initial predetermined pre-load and for maintaining it under such a pre-load in order that forces of the desired volume may be developed and released incident to the operation of the instrumentality with which the device is associated.

A further object is to provide a device having an overall working length which remains constant yet wherein the value of the initial pre-load on the fluid medium may be regulated as circumstances may require.

A still further object is to provide a device wherein the parts are so designed that the walls, or portions thereof, within which the compressible fluid medium is confined will not be subjected to excessive stresses resulting from repeated compression of the fluid medium.

A still further object is to provide a device which may be filled with facility with the compressible fluid medium without the entrainment of air.

A still further object is to minimize leakage of the compressible fluid medium from the chamber in which it is confined.

A still further object is a novel design and arrangement of the parts of the device, whereby to provide for simplicity, economy, and compactness in construction and facilitate assembling and disassembling of the parts.

The device is illustrated in the accompanying drawing, wherein.

Figure 1:
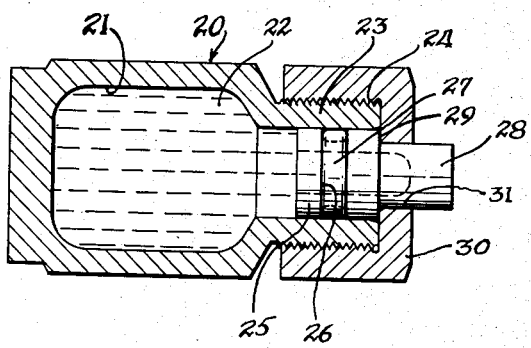
Figure 1 is a longitudinal sectional view through a device embodying the features of the invention.

The device, as illustrated, is unitary in nature and comprises a container 20 which provides a chamber 21 for a compressible fluid 22. The container 20 is formed, or provided, with a neck or extension 23. The latter is externally threaded as indicated at 24 and is formed to provide a cylinder for a piston 25, the bore in the cylinder preferably being machined and provided with a high finish.

The piston 25, as illustrated, may be formed with an annular channel 26 which accommodates a sealing ring 27 and it may be hollow (see Figure 2) so that the pressure developed within the container may be availed of to deflect the walls of the piston outwardly to augment the sealing action of the ring 27. The piston 25 carries an axial extension 28, a shoulder 29 being provided by the piston at its zone of juncture with the extension.

The neck 23 provides a filling opening through which the compressible fluid 22 may be introduced into the chamber 21 and it carries a threaded cap 30 which seats against the end of the neck 23 and which is formed with an opening 31 for accommodating the piston extension 28. The cap 30 provides a stop with which the shoulder 29 on the piston 25 cooperates to determine the normal position of the piston, i. e. the position illustrated in Figure 1.

Assuming the chamber 21 to be filled with the compressible fluid 22 and the piston 25 to occupy the position shown in Figure 1, it will be apparent that any movement of the piston in the cylinder away from the stop provided by the cap 30 will result in compression of the said fluid. Upon release of the piston, the fluid 22 will expand to return the latter to its normal position against said stop, performing work as it does this. In this connection, it will be understood, of course, that movement of the piston to compress the fluid 22 involves the use of the extension 28 and that the return movement of the piston to perform work also utilizes said extension.

In assembling the device, the fluid 22 is introduced into the container through the neck 23. Assuming that preloading of the device is not desired, the container will be filled to the height at which when the piston is inserted and the cap 30 applied, as indicated in Figure 1, the chamber 21 and that portion of the cylinder not occupied by the piston will be completely occupied by the compressible fluid.

The device has the advantage that it may be preloaded to varying degrees when a shorter-stroke, higher-load characteristic is desired. In this event, the container will be filled with the compressible fluid either to the top of the neck 23 or to some point below this level depending upon the pre-load desired. After the piston is introduced into the bore in the neck 23 and the cap 30 assembled in operative relation with respect to the threads on the neck, the device may be placed in a press or a vise and the piston 25 caused to enter the bore 23, compressing the fluid 22 as this occurs, until the cap 30 may be threaded on the neck 23 far enough to seat against the end of the neck. Upon removal of the device from the press or vise, the cap 30 will hold the piston in the normal position illustrated in Figure 1, in which position the fluid 22 will be maintained in a pre-loaded condition, whereby in the operation of the piston, in the manner heretofore described, the fluid 22 will be further loaded so that the device will be characterized by a short-stroke high-load characteristic. Thus by adding or removing fluid the characteristics of the device may be varied as required and at will.

Figure 2:
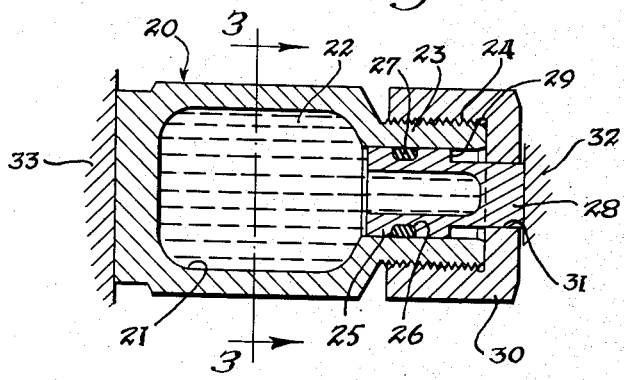
Figure 2 is a similar section showing the relation of the parts upon compression of the fluid medium to store the forces which are to be subsequently released when the parts are permitted to return to their normal positions, as illustrated in Figure 1; and, Figure 3 is a transverse section taken along line 3—3 of Figure 2.
Figure 3:
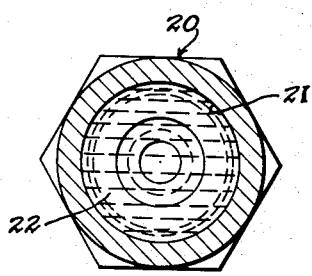

The manner in which energy is stored in the device is illustrated in Figure 2 wherein the device is located between elements 32 and 33 which, as they are moved together, cause the piston 25 to compress the fluid 22. The energy which is thereby stored in the fluid 22 will be released upon separation of the elements 32 and 33 and is available to perform useful work.

It will be noted that the device is so designed that leakage of the fluid 22 is minimized.

The device has the further advantage that the threaded connection between the neck 23 of the container and the cap 30 is not subjected to maximum fatigue stresses under high load conditions.

In the description of the device, reference has been made to its use in connection with blanking apparatus. It is to be understood that this is intended by way of example only and that the device may be utilized for other purposes although, as noted, it has particular utility in many applications in which mechanical springs have been heretofore employed.

I claim as my invention:

1. A liquid spring comprising a container having an internal chamber provided with a guide cylinder at one end and filled with a body of compressible liquid, and a piston which is reciprocable in said cylinder, said cylinder being closed except at said one end, said piston being movable inwardly of said container under load to compress said liquid and being movable outwardly by said liquid when said load is released and said liquid is permitted to expand, said piston having a cavity at its inner end which communicates with said chamber, a sealing member carried in the portion of the wall of said piston which surrounds said cavity and engaging the wall of said cylinder, said portion of said piston wall being deflectable radially outwardly in response to the pressure developed in said liquid when said piston is moved inwardly, to take up clearance between said piston and said cylinder and to increase the sealing pressure on said sealing member whereby to prevent leakage of said liquid from said container between said cylinder and said piston.

2. A liquid spring comprising a container having an internal chamber provided with a guide cylinder at one end and filled with a body of compressible liquid, and a piston which is reciprocable in said cylinder, said cylinder being closed except at said one end, said piston being movable inwardly of said container under load to compress said liquid and being movable outwardly by said liquid when said load is released and said liquid is permitted to expand, said piston having a cavity at its inner end which communicates with said chamber, a sealing member carried in the portion of the wall of said piston which surrounds said cavity and engaging the wall of said cylinder, said portion of said piston wall being deflectable radially outwardly in response to the pressure developed in said liquid when said piston is moved inwardly to take up clearance between said piston and said cylinder and to increase the sealing pressure on said sealing member whereby to prevent leakage of said liquid from said container between said cylinder and said piston, and a member secured to said container in position to engage said piston to limit outward movement of said piston, said member being adjustable on said container to preload said spring.

References Cited in the file of this patent

UNITED STATES PATENTS

| | | |
|---|---|---|
| 1,142,825 | Lyons | June 15, 1915 |
| 2,554,807 | Bingham | May 29, 1951 |

FOREIGN PATENTS

| | | |
|---|---|---|
| 105,053 | Great Britain | Mar. 21, 1917 |
| 464,580 | Great Britain | Apr. 19, 1937 |
| 571,540 | Great Britain | Aug. 29, 1945 |
| 641,527 | Great Britain | Aug. 16, 1950 |